United States Patent
Pan et al.

(10) Patent No.: US 11,924,635 B2
(45) Date of Patent: Mar. 5, 2024

(54) SECURITY AUTHENTICATION METHOD AND APPARATUS THEREOF, AND ELECTRONIC DEVICE

(71) Applicants: ZHEJIANG GEELY HOLDING GROUP CO., LTD, Zhejiang (CN); ZHEJIANG GEELY AUTOMOBILE RESEARCH INSTITUTE (NINGBO) CO., LTD, Zhejiang (CN)

(72) Inventors: Lanlan Pan, Ningbo (CN); Xiaolei Zhao, Ningbo (CN); Shicen Zheng, Ningbo (CN)

(73) Assignees: ZHEJIANG GEELY HOLDING GROUP CO., LTD, Zhejiang (CN); ZHEJIANG GEELY AUTOMOBILE RESEARCH INSTITUTE (NINGBO) CO., LTD, Zhejiang (CN)

( * ) Notice: Subject to any disclaimer, the term of this patent is extended or adjusted under 35 U.S.C. 154(b) by 0 days.

(21) Appl. No.: 17/801,690

(22) PCT Filed: Feb. 20, 2021

(86) PCT No.: PCT/CN2021/077099
§ 371 (c)(1),
(2) Date: Aug. 23, 2022

(87) PCT Pub. No.: WO2021/169880
PCT Pub. Date: Sep. 2, 2021

(65) Prior Publication Data
US 2023/0123241 A1    Apr. 20, 2023

(30) Foreign Application Priority Data
Feb. 24, 2020   (CN) .......................... 202010111071.4

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0428* (2013.01); *H04W 4/80* (2018.02); *H04W 12/041* (2021.01)

(58) Field of Classification Search
CPC ...... H04W 12/06; H04W 12/041; H04W 4/80
See application file for complete search history.

(56) References Cited

U.S. PATENT DOCUMENTS 9,674,705 B2 *   6/2017  Rose ..................... H04L 9/3231
10,127,409 B1 *  11/2018 Wade ..................... G06F 21/75
(Continued)

FOREIGN PATENT DOCUMENTS

CN     102638794 A      8/2012
CN     103391197 A     11/2013
(Continued)

OTHER PUBLICATIONS

Z. Wei, Y. Yanjiang, Y. Wu, J. Weng and R. H. Deng, "HIBS-KSharing: Hierarchical Identity-Based Signature Key Sharing for Automotive," in IEEE Access, vol. 5, pp. 16314-16323, 2017. (Year: 2017).*
(Continued)

*Primary Examiner* — Kari L Schmidt
(74) *Attorney, Agent, or Firm* — Alston & Bird LLP

(57) ABSTRACT

Disclosed are a security authentication method and an apparatus thereof, and an electronic device. The method includes: sending a verification request to a verification end; receiving a first data packet and acquiring third preset data, fourth preset data, second time data, a control instruction, and fifth preset data, the first data packet being determined
(Continued)

by the verification end in response to the verification request; generating a key based on the third preset data, the fourth preset data, the second time data, and the first data packet; encrypting the control instruction and the fifth preset data based on the key to generate first encrypted data; and sending the first encrypted data to the verification end, so that the verification end sends the control instruction and the fifth preset data to an execution end, and the execution end executes the control instruction based on the following method: determining whether the fifth preset data is the same as internal preset data; and if so, executing the control instruction. The present invention can reduce interaction process, improve the time delay experience, and reduce a risk of malicious power consumption due to NFC-Key encryption and decryption behaviors triggered by fake messages of a card reader.

8 Claims, 5 Drawing Sheets

(51) Int. Cl.
    *H04W 4/80*         (2018.01)
    *H04W 12/041*     (2021.01)

(56) References Cited

U.S. PATENT DOCUMENTS

| | | | |
|---|---|---|---|
| 10,257,700 B2* | 4/2019 | Kang | H04W 12/0433 |
| 10,373,167 B2* | 8/2019 | Zovi | G06Q 20/4016 |
| 11,386,424 B2* | 7/2022 | Dicker | H04L 9/0891 |
| 2004/0177369 A1* | 9/2004 | Akins, III | H04N 21/4147 380/278 |
| 2005/0132192 A1 | 6/2005 | Jeffries et al. | |
| 2006/0165233 A1* | 7/2006 | Nonaka | G06F 21/10 380/44 |
| 2007/0016796 A1* | 1/2007 | Singhal | G07F 7/1008 713/184 |
| 2009/0144550 A1* | 6/2009 | Arunan | H04L 63/068 713/171 |
| 2011/0291803 A1* | 12/2011 | Bajic | G08B 13/2462 340/10.1 |
| 2014/0181955 A1* | 6/2014 | Rosati | G06F 21/35 726/18 |
| 2014/0298027 A1* | 10/2014 | Roberts | G06Q 20/20 713/171 |
| 2015/0295919 A1 | 10/2015 | Van Kerrebroeck et al. | |
| 2016/0099752 A1* | 4/2016 | Lee | H04B 5/0031 455/41.1 |
| 2016/0300417 A1* | 10/2016 | Hatton | G07C 9/00857 |
| 2016/0358396 A1* | 12/2016 | Spiess | H04B 5/0031 |
| 2017/0105120 A1* | 4/2017 | Kang | H04L 63/064 |
| 2017/0164200 A1* | 6/2017 | Näslund | H04W 12/069 |
| 2017/0236343 A1 | 8/2017 | Leboeuf et al. | |
| 2017/0330184 A1* | 11/2017 | Sabt | G06Q 20/327 |
| 2017/0346851 A1* | 11/2017 | Drake | H04L 9/0838 |
| 2017/0374550 A1* | 12/2017 | Auer | H04B 5/0025 |
| 2018/0123645 A1* | 5/2018 | Jang | G06K 19/0723 |
| 2019/0036701 A1* | 1/2019 | Solhjell | H04L 9/3226 |
| 2019/0052609 A1* | 2/2019 | Skuratovich | H04L 63/0428 |
| 2019/0095655 A1* | 3/2019 | Krawczewicz | H04L 9/3234 |
| 2022/0070666 A1* | 3/2022 | Hua | H04W 12/033 |
| 2022/0109667 A1* | 4/2022 | Gorog | H04L 9/0877 |
| 2022/0109683 A1* | 4/2022 | Xu | H04L 45/566 |

FOREIGN PATENT DOCUMENTS

| | | |
|---|---|---|
| CN | 104254068 A | 12/2014 |
| CN | 104537298 A | 4/2015 |
| CN | 106682905 A | 5/2017 |
| CN | 108973934 A | 12/2018 |
| CN | 110065470 A | 7/2019 |
| CN | 110110568 A | 8/2019 |
| CN | 111432373 A | 7/2020 |
| KR | 20120094673 A | 8/2012 |
| WO | WO 2018/014723 A1 | 1/2018 |

OTHER PUBLICATIONS

G. Revadigar, C. Javali and S. Jha, "ProxiCar: Proximity-Based Secure Digital Key Solution for Cars," 2020 International Conference on COMmunication Systems & NETworkS (COMSNETS), Bengaluru, India, 2020, pp. 282-289. (Year: 2020).*
J. Wang, K. Lounis and M. Zulkernine, "CSKES: A Context-Based Secure Keyless Entry System," 2019 IEEE 43rd Annual Computer Software and Applications Conference (COMPSAC), Milwaukee, WI, USA, 2019, pp. 817-822. (Year: 2019).*
Written Opinion of the International Searching Authority for PCT/CN2021/077099 (ISA/CN) dated May 20, 2021 (5 pages).
International Search Report and Wiitten Opinion for PCT/CN2021/077099 (ISA/CN) dated May 19, 2021 (9 pages).
Search Report for China Patent Application No. 2020101110714 dated May 24, 2022 (3 pages).
Notice of Grant for China Patent Application No. 2020101110714 dated Jun. 6, 2022 (1 page).
Stefan Tillich et al, "*Security Analysis of an Open Car Immobilizer Protocol Stack*," International Association for Cryptologic Research (IACR), vol. 20121102:110042, Oct. 31, 2012, pp. 1-13, XP061006906.
Hamadaqa Emad et al., "*Clone-resistant vehicular RKE by deploying SUC*,", 2017 Seventh International Conference on Emerging Security Technologies (EST), IEEE, Sep. 6, 2017, pp. 221-225, [retrieved from Internet Sep. 14, 2023].
Patel Jinita et al., "*On the Security of Remote Key Less Entry for Vehicles*", 2018 International Conference On Advanced Networks and Telecommunications Systems (ANTS), IEEE, Dec. 16, 2018, pp. 1-6 XP033547165.
Xiao Ni et al., "*AES Security Protocol Implementation for Automobile Remote Keyless System*," IEEE, VTS, Vehicular Technology Conference, Proceedings, US, Apr. 1, 2007 pp. 2526-2529, XP031093086.
$1^{st}$ Office Action for European Patent Application No. 21761102.9 dated Jun. 9, 2023 (9 pages).
European Search Report for European Application No. 21761102.9 dated May 24, 2023 (6 pages).

* cited by examiner

SECURITY AUTHENTICATION METHOD AND APPARATUS THEREOF, AND ELECTRONIC DEVICE

CROSS-REFERENCE TO RELATED APPLICATIONS

This application is a national phase entry of International Application No. PCT/CN2021/077099, filed Feb. 20, 2021, which claims priority to Chinese Application No. 202010111071.4, filed Feb. 24, 2020, the entire contents of which are each incorporated herein by reference.

FIELD OF THE INVENTION

The present invention relates to the technical field of security authentication, and in particular to a security authentication method and an apparatus thereof, and an electronic device.

BACKGROUND OF THE INVENTION

A near field communication (NFC) key is a basic application of the Internet of vehicles, and is responsible for key functions such as vehicle door opening and closing and engine starting. A request end security authentication usually requires participation of four types of assemblies, namely, a request end (denoted as an NFC-Key), a vehicle end NFC card reader (denoted as an NFC-Reader), a vehicle end NFC controller (denoted as an NFC-Controller), and a vehicle body controller (denoted as a Central-Controller).

The NFC-Key and the NFC-Reader exchange information, and the NFC-Controller is responsible for mutual security authentication with the NFC-Key. Finally, the NFC-Controller transmits the sensitive information of the request end to the Central-Controller to determine whether to unlock the vehicle. The existing security authentication mechanism requires multiple bidirectional interactive negotiation keys, has a high requirement on the bus data transmission rate of the NFC-Reader and the NFC-Controller, and is difficult to be compatible with the communication scenarios of an LIN bus and a CAN bus.

Therefore, there is an urgent need to provide a technical solution for a security authentication method, an apparatus thereof and an electronic device, so that the interaction process can be reduced, the time delay experience can be improved, and the risk of malicious power consumption due to NFC-Key encryption and decryption behaviors triggered by fake messages of a card reader can be reduced.

BRIEF DESCRIPTION OF THE INVENTION

With regard to the above-mentioned problems in the prior art, the present invention provides a security authentication method, the method including:
  sending a verification request to a verification end;
  receiving a first data packet and acquiring third preset data, fourth preset data, second time data, a control instruction, and fifth preset data, where the first data packet is determined by the verification end in response to the verification request;
  generating a key based on the third preset data, the fourth preset data, the second time data, and the first data packet;
  encrypting the control instruction and the fifth preset data based on the key to generate first encrypted data; and
  sending the first encrypted data to the verification end, so that the verification end sends the control instruction and the fifth preset data to an execution end, and the execution end executes the control instruction based on the following method: determining whether the fifth preset data is the same as internal preset data; and if so, executing the control instruction.

Further, the first data packet includes: first preset data, a random number group, first time data, and first verification data; and
  the generating a key based on the third preset data, the fourth preset data, the second time data, and the first data packet includes:
  determining second verification data based on the third preset data, the fourth preset data, the first time data, and the random number group;
  determining whether the first verification data is the same as the second verification data;
  if the first verification data is the same as the second verification data, determining whether a difference between the first time data and the second time data is greater than a preset time threshold; and
  if the difference between the first time data and the second time data is greater than the preset time threshold, generating the key based on the fourth preset data and the first data packet.

Further, before sending the verification request to the verification end, the method further includes: establishing a near-field communication connection with the verification end.

In another aspect, the present invention provides a security authentication method, the method including:
  searching for, in response to a verification request sent by a request end, first preset data corresponding to the verification request and second preset data corresponding to the verification request, and generating a random number group and first time data based on the verification request;
  determining first verification data, where the first verification data is determined based on the first preset data, the second preset data, the random number group and the first time data;
  sending a first data packet to the request end, where the first data packet includes: the first preset data, the random number group, the first time data, and the first verification data;
  receiving first encrypted data, and generating second encrypted data based on the first encrypted data, where the first encrypted data is generated at the request end based on the first data packet, and the second encrypted data includes: a control instruction and fifth preset data; and
  sending the second encrypted data to an execution end, where the execution end executes the control instruction based on the following method: determining whether the fifth preset data is the same as internal preset data; and if so, executing the control instruction.

Further, the searching for, in response to a verification request sent by a request end, first preset data corresponding to the verification request and second preset data corresponding to the verification request, and generating a random number group and first time data based on the verification request includes:
  verifying whether the verification request matches an internal preset verification request; and
  if the verification request matches the internal preset verification request, searching for the first preset data corresponding to the verification request and the second preset data corresponding to the verification request, and generating the random number group and the first time data based on the verification request.

Further, the generating second encrypted data based on the first encrypted data includes:
generating a key based on the second preset data and the first data packet;
obtaining the control instruction and the fifth preset data by using the key to decrypt the first encrypted data; and
generating the second encrypted data by encrypting the control instruction and the fifth preset data.

Further, the method further includes:
deleting temporary data, where the temporary data includes: the random number group, the first time data, the first verification data, the key, the first encrypted data, the control instruction, the fifth preset data, and the second encrypted data.

In another aspect, the present invention provides an apparatus of a security authentication method, the apparatus including:
a first sending module, configured to send a verification request to a verification end;
a first receiving module, configured to receive a first data packet and obtain third preset data, fourth preset data, second time data, a control instruction, and fifth preset data, where the first data packet is determined by the verification end in response to the verification request;
a key generating module, configured to generate a key based on the third preset data, the fourth preset data, the second time data, and the first data packet;
a first encrypted data generating module, configured to encrypt the control instruction and the fifth preset data based on the key to generate first encrypted data; and
a second sending module, configured to send the first encrypted data to the verification end, so that the verification end sends the control instruction and the fifth preset data to an execution end, and the execution end executes the control instruction based on the following method: determining whether the fifth preset data is the same as internal preset data; and
if so, executing the control instruction.

Further, the first data packet includes: first preset data, a random number group, first time data, and first verification data, and the key generating module includes:
a second verification data determining unit, configured to determine the second verification data based on the third preset data, the fourth preset data, the first time data, and the random number group;
a first judging unit, configured to judge whether the first verification data is the same as the second verification data;
a second judging unit, configured to, if the first verification data is the same as the second verification data, judge whether a difference between the first time data and the second time data is greater than a preset time threshold; and
a first key generating unit, configured to, if the difference between the first time data and the second time data is greater than the preset time threshold, generate the key based on the fourth preset data and the first data packet.

In still another aspect, the present invention provides an apparatus of a security authentication method, the apparatus including:
a response module, configured to search for, in response to a verification request sent by a request end, first preset data corresponding to the verification request and second preset data corresponding to the verification request, and generate a random number group and first time data based on the verification request;
a first verification data determining module, configured to determine first verification data, where the first verification data is determined based on the first preset data, the second preset data, the random number group and the first time data;
a third sending module, configured to send a first data packet to the request end, where the first data packet includes: the first preset data, the random number group, the first time data, and the first verification data;
a second receiving module, configured to receive first encrypted data, and generate second encrypted data based on the first encrypted data, where the first encrypted data is generated from the request end based on the first data packet, and the second encrypted data includes: a control instruction and fifth preset data; and
a fourth sending module, configured to send the second encrypted data to an execution end, where the execution end executes the control instruction based on the following method: determining whether the fifth preset data is the same as internal preset data; and if so, executing the control instruction.

Further, the response module further includes:
a verification unit, configured to verify whether the verification request matches an internal preset verification request; and
a random number group generating unit, configured to, if the verification request matches the internal preset verification request, search for the first preset data corresponding to the verification request and the second preset data corresponding to the verification request, and generate the random number group and the first time data based on the verification request.

Further, the second receiving module includes:
a second key generating unit, configured to generate a key based on the second preset data and the first data packet;
a decryption unit, configured to obtain the control instruction and the fifth preset data by using the key to decrypt the first encrypted data; and
a second encrypted data generating unit, configured to generate the second encrypted data by encrypting the control instruction and the fifth preset data.

Further, the apparatus further includes:
a deleting module, configured to delete temporary data, where the temporary data includes: the random number group, the first time data, the first verification data, the key, the first encrypted data, the control instruction, the fifth preset data, and the second encrypted data.

In another aspect, the present invention provides an electronic device, the electronic device including a processor and a memory, where the memory stores at least one instruction, at least one program, and a code set or an instruction set, where the at least one instruction, the at least one program, and the code set or the instruction set are loaded and executed by the processor to implement the security authentication methods described above.

In still another aspect, the present invention provides a computer-readable storage medium, the storage medium storing at least one instruction, at least one program, and a code set or an instruction set, where the at least one instruction, the at least one program, and the code set or the instruction set are loaded and executed by a processor to implement the security authentication methods described above.

In still another aspect, the present invention provides a vehicle, the vehicle being provided with a close range wireless communication system, where the close range wireless communication system includes the apparatus of the security authentication method described above.

The present invention provides a security authentication method and an apparatus thereof, and an electronic device, and has the following beneficial effects:

(1) Timestamp_or_Counter is designed in a key structure, which is compatible with both a form of a timestamp and a form of a counter, and supports replay attack check in a plurality of application scenarios such as an NFC entity card key, a mobile phone NFC application key, and a bracelet request end.

(2) A vehicle end provides related information required for generating a session key while providing Key_ID information to an NFC-Key, thereby reducing interaction process and improving time delay experience.

(3) The vehicle end provides a message authentication code (MAC) while providing the Key_ID information to the NFC-Key. The NFC-Key may reversely verify, based on the MAC, whether the information is from the bound vehicle, so as to reduce the risk of malicious power consumption due to NFC-Key encryption and decryption behaviors triggered by fake messages of a card reader.

(4) The vehicle end is responsible for providing related information required for each session key (Session_Key), and the NFC-Key directly calculates the session key (Session_Key) based on the related information provided by the vehicle end in one-way. A vehicle and a key do not need a three-way handshake negotiation for the session key.

BRIEF DESCRIPTION OF THE DRAWINGS

In order to illustrate the technical solutions of the present invention more clearly, the following is a brief description of the accompanying drawings that need to be used in the descriptions of the embodiments or the prior art. Apparently, the accompanying drawings in the following descriptions are only some embodiments of the present invention, and those of ordinary skill in the art may still obtain other drawings from these drawings without creative efforts.

Here, 710—first sending module, 720—first receiving module, 730—key generating module, 740—first encrypted data generating module, and 750—second sending module; and 1010—response module, 1020—first verification data determining module, 1030—third sending module, 1040—second receiving module, and 1050—fourth sending module.

DETAILED DESCRIPTION

The technical solutions in the embodiments of the present invention are described clearly and completely in the following with reference to accompanying drawings in the embodiments of the present invention. Apparently, the described embodiments are only part rather than all of the embodiments of the present invention. Based on the embodiments of the present invention, all other embodiments obtained by those of ordinary skill in the art without creative efforts shall fall within the protection scope of the present invention.

It should be noted that the terms "first", "second", and the like in the specification, the claims, and the accompanying drawings of the present invention are used to distinguish between similar objects and not necessarily to describe a specific sequence or order. It should be understood that data so used are interchangeable under appropriate circumstances, such that the embodiments of the present invention described herein can be implemented in a sequence other than those illustrated or described herein. In addition, the terms "comprising", and "having" and any variation thereof are intended to cover non-exclusive inclusion. For example, a process, method, apparatus, product, or device including a series of steps or units is not necessarily limited to the explicitly listed steps or units, but may include other steps or units that are not explicitly listed or are inherent to such process, method, product, or device.

Figure 1:
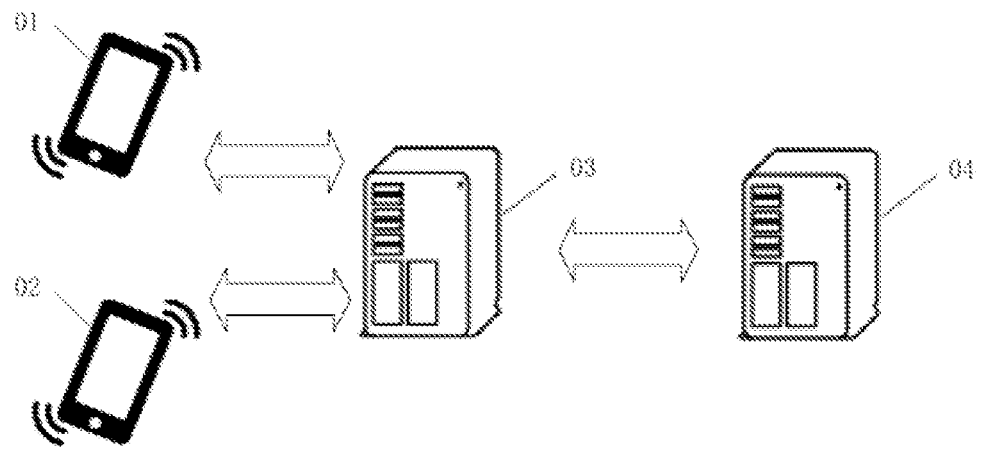
FIG. 1 is a schematic diagram of a system provided by an embodiment of the present application.

Referring to FIG. 1, FIG. 1 is a schematic diagram of a system provided by an embodiment of the present application. As shown in FIG. 1, the system may at least include a first terminal 01, a second terminal 02, a server 03, and an execution terminal 04.

Specifically, the first terminal 01 and the second terminal 02 may each include an entity device having an NFC function, such as a smart phone, a tablet computer, a notebook computer, a digital assistant, an intelligent wearable device, and a vehicle terminal, and may also include a software having the NFC function and running in the entity device, such as an NFC entity card key, a mobile phone NFC application key, and a bracelet NFC key.

Specifically, the server 03 may include an independently running server, or a distributed server, or a server cluster composed of a plurality of servers. The server 03 may include a network communication unit, a processor, a memory, etc. The server 03 may provide background services for the first terminal 01 and the second terminal 02.

Specifically, the execution terminal 04 may include an entity device, such as a smart phone, a tablet computer, a notebook computer, a digital assistant, an intelligent wearable device, and a vehicle terminal, and may also include a software running in the entity device; and in some scenarios, the execution terminal 04 may be a device for controlling opening of a door, a device for controlling ignition of an engine, etc.

The above system is merely an exemplary system of the present application.

Figure 2:
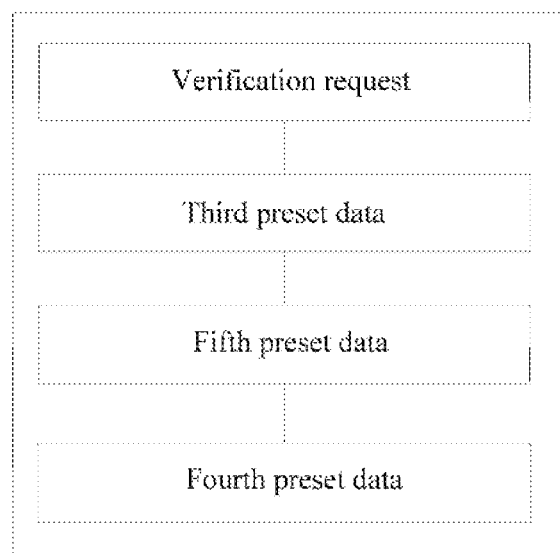
FIG. 2 is a structural schematic diagram of a request end provided by an embodiment of the present invention.
Figure 3:
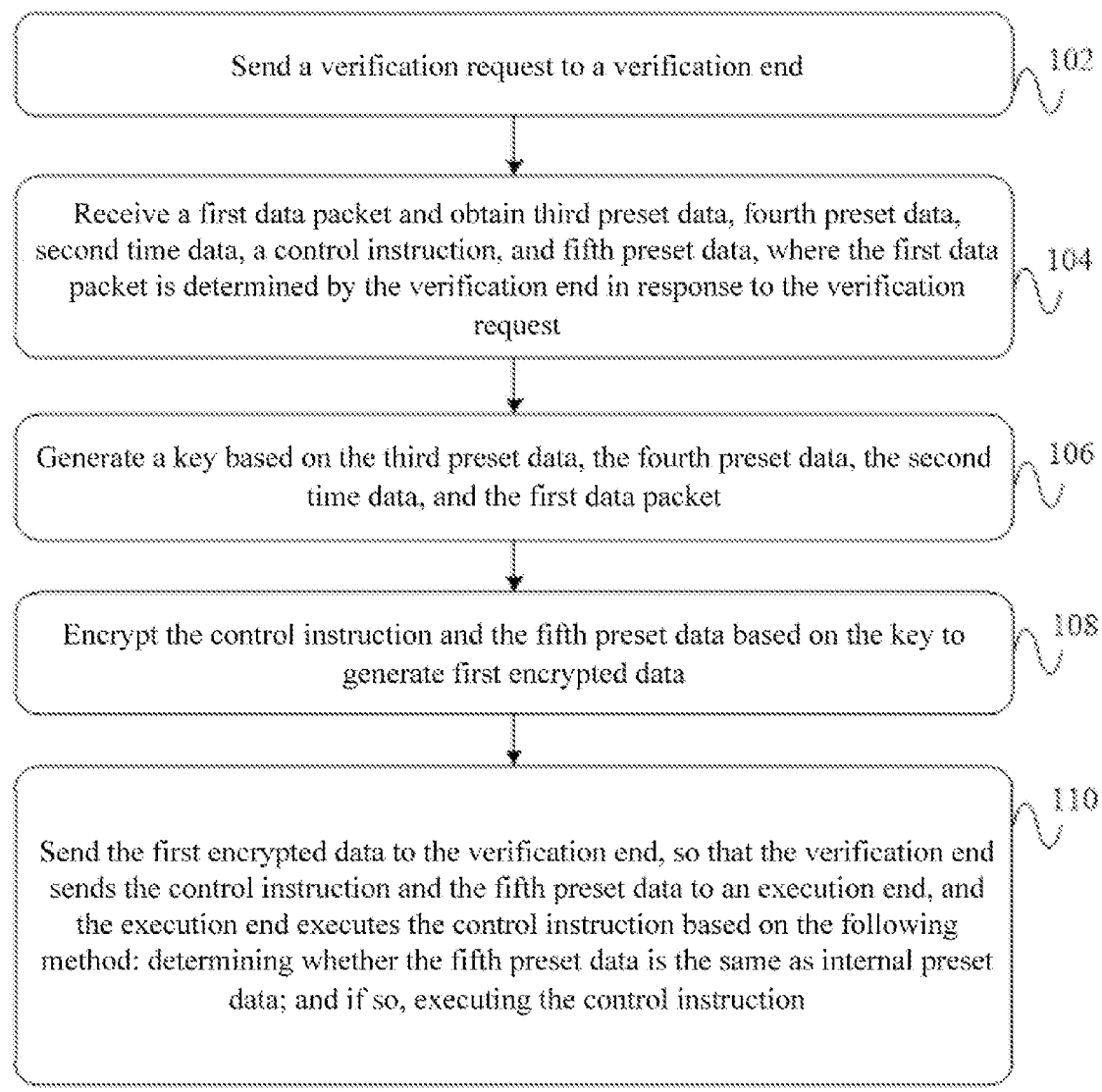
FIG. 3 is a flow chart of a security authentication method provided by an embodiment of the present invention.

A security authentication method of the present invention is described in the following, and the execution body of the embodiment is a request end. Referring to FIG. 2 and FIG. 3 of the specification, FIG. 2 is a schematic structural diagram of the request end provided by an embodiment of the present invention; FIG. 3 is a flowchart of the security authentication method provided by an embodiment of the present invention; and on the premise that a near-field communication is established between the request end and an NFC-Controller, the NFC-Controller may correspond to a plurality of different request ends, and the communication connection may be a connection between the request end and a card reader of a verification end. The embodiment of the specification uses a single request end to set forth the method, the method including:

S102: a verification request is sent to a verification end.

Specifically, after the near-field communication is established between the request end and the NFC-Controller, the request end sends the verification request to the verification end, where the verification request may be an NFC_Card_ID, and the verification end may be the NFC-Controller.

In some possible embodiments, each request end may include the following four information or instructions:

(1) the NFC_Card_ID, i.e., a verification request: a unique identifier of an NFC application, which is preset by an automobile manufacturer at a vehicle end NFC-Controller and the request end. For example, a certain NFC_Card_ID identifies an Internet of vehicles key unlocking application.

(2) A Key_ID, i.e., third preset data: a unique identifier of the request end, which is preset by the automobile manufacturer at the vehicle end NFC-Controller and the request end.

Each key entity (e.g., a card, a mobile phone, a bracelet, etc.) may have a plurality of different request ends under the same NFC_Card_ID, which are responsible for opening different vehicles, and correspondingly, the key entity may also have a plurality of different Key_IDs.

Each vehicle may have a plurality of different NFC_Card_IDs, which is equivalent to that each vehicle may have a plurality of different request ends.

Each NFC_Card_ID on each vehicle can only correspond to a unique Key_ID, which is equivalent to that each key entity only has a unique request end on each vehicle.

(3) Sensitive_Information, i.e., fifth preset data: sensitive information that is determined by a vehicle end Central-Controller whether to allow unlocking, and is preset by the automobile manufacturer at the vehicle end Central-Controller and the request end. Each Key_ID has a unique Sensitive_Information of the request end, and the Sensitive_Information corresponding to different Key_IDs are not related to each other.

(4) A Communication_Key, i.e., fourth preset data: a symmetric key which is used for mutual encrypted communication between the vehicle end NFC-Controller and the request end, and is preset by the automobile manufacturer at the vehicle end NFC-Controller and the request end. Each Key_ID has a unique Communication_Key of the request end, and the Communication_Keys corresponding to different Key_IDs are not related to each other.

In addition, an In_Vehicle_NFC_Message_Key, as a symmetric key for mutual encrypted communication between the vehicle end NFC-Controller and the Central-Controller, is preset by the automobile manufacturer at the vehicle end NFC-Controller and the Central-Controller.

S104: a first data packet is received and third preset data, fourth preset data, second time data, a control instruction, and fifth preset data are obtained, where the first data packet is determined by the verification end in response to the verification request.

Specifically, the third preset data may be a Key_ID, the fourth preset data may be a Communication_Key, the second time data may be time information sent by the NFC-Controller after the request end is in communication connection with the NFC-Controller in the last cycle, the control instruction may be used to execute the opening of a vehicle door or the ignition of an engine and so on, and the fifth preset data may be the Sensitive_Information. The first data packet may include first preset data KEY_ID, a random number group Random_Number, first time data, and first verification data. It should be noted that the last cycle represents the last session or an information exchange process between the request end and the NFC-Controller at the last time.

S106: a key is generated based on the third preset data, the fourth preset data, the second time data, and the first data packet.

In some possible embodiments, the step that a key is generated based on the third preset data, the fourth preset data, the second time data, and the first data packet includes:

determining second verification data based on the third preset data, the fourth preset data, the first time data, and the random number group;

determining whether the first verification data is the same as the second verification data;

if the first verification data is the same as the second verification data, determining whether a difference between the first time data and the second time data is greater than a preset time threshold; and if the difference between the first time data and the second time data is greater than the preset time threshold, generating the key based on the fourth preset data and the first data packet.

Specifically, both the first verification data and the second verification data may be an MAC, where the MAC may be calculated by an MAC_Generation_Algorithm.

MAC=MAC_Generation_Algorithm(Communication_Key, Key_ID||Timestamp_or_Counter||Random_Number)

A Timestamp_or_Counter may choose either a Timestamp form or a Counter form. For example, in a scenario of an NFC-Key of a mobile phone, the Timestamp form may be directly selected; and in a scenario of a card NFC-Key, the Counter form may be selected.

Specifically, the request end may calculate the MAC by using the MAC_Generation_Algorithm, and compare whether the MAC is consistent with an MAC value in the first data packet received. If not, a session is ended. If so, it is verified whether the difference between the first time data and the second time data is greater than the preset time threshold. When the difference between the first time data and the second time data is greater than the preset time threshold, a current session key (Session_Key) is generated by using the Communication_Key in combination with the first data packet; and when the difference between the first time data and the second time data is less than the preset time threshold, the current session is ended.

It should be noted that the preset time threshold is not specifically limited in the embodiments of the present invention, and may be set according to actual needs.

Session key(Session_Key)=Key_Generation_Algorithm(Communication_Key,Key_ID||TS_or_Counter||Random_Number||MAC).

S108: the control instruction and the fifth preset data are encrypted based on the key to generate first encrypted data.

Specifically, NFC-Key may use the Session_Key to encrypt {Command.control instruction, Sensitive_Information fifth preset data} to generate the first encrypted data.

The first encrypted data Action_Cipher=Symmetric_Algorithm_Encrypt (Session_Key, Command||Sensitive_Information).

S110: the first encrypted data is sent to the verification end, so that the verification end sends the control instruction and the fifth preset data to an execution end, and the execution end executes the control instruction based on the following method: determining whether the fifth preset data is the same as internal preset data; and if so, executing the control instruction.

Specifically, the request end may transmit the first encrypted data Action_Cipher to an NFC-Controller verification end, where Command is an instruction to be executed, i.e., a control instruction.

The verification end may use the Session_Key to decrypt the first encrypted data to obtain the Command control instruction and the Sensitive_Information fifth preset data. The Command control instruction and the Sensitive_Information fifth preset data are encrypted by encrypting {Command, Sensitive_Information} information by using In_Vehicle_NFC_Message_Key to generate second encrypted data, the second encrypted data is transmitted to a Central-Controller execution end, and the execution end executes the control instruction based on the following method: determining whether the fifth preset data is the same as internal preset data; if so, executing the control instruction; and if not, the current session is ended.

According to the security authentication method provided by the present invention, a vehicle end provides the related information required for generating a session key while providing Key_ID information to the NFC-Key, thereby reducing an interaction process and improving time delay experience.

According to the above embodiments, in an embodiment of the present specification, before sending the verification request to the verification end, the method further includes: establishing a near-field communication connection with the verification end.

The vehicle end provides a message authentication code (MAC) while providing the Key_ID information to the NFC-Key. The NFC-Key may verify, based on the MAC, whether the information is from the bound vehicle, so as to reduce a risk of malicious power consumption due to NFC-Key encryption and decryption behaviors triggered by fake messages of a card reader.

The vehicle end is responsible for providing related information required for each session key (Session_Key), and the NFC-Key directly calculates the session key (Session_Key) based on the related information provided by the vehicle end in one-way. A vehicle and a key do not need a three-way handshake negotiation for the session key.

Figure 4:
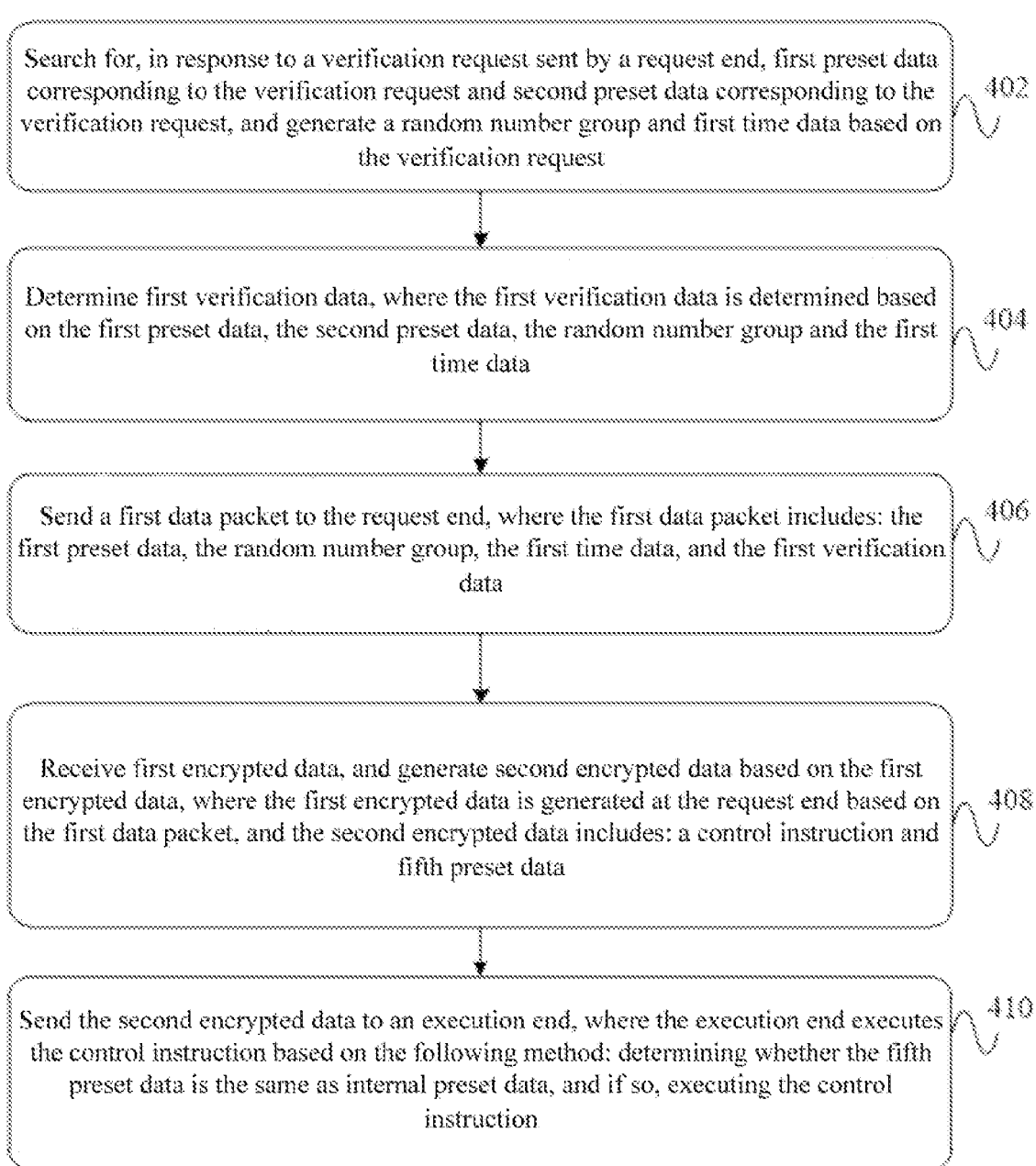
FIG. 4 is a flow chart of another security authentication method provided by an embodiment of the present invention.

In another aspect, another security authentication method provided by the present invention is described in the following, and the execution body of the embodiment is a verification end NFC-Controller. Referring to FIG. 4 of the specification, a flowchart of the another security authentication method provided by an embodiment of the present invention is shown; and on the premise that a near-field communication is established between the request end and the verification end NFC-Controller, the verification end NFC-Controller may correspond to a plurality of different request ends, and the embodiment of the specification uses a single request end to set forth the method, the method including:

S402: in response to a verification request sent by a request end, first preset data corresponding to the verification request and second preset data corresponding to the verification request are searched for, and a random number group and first time data are generated based on the verification request.

Specifically, after receiving the verification request, the verification end NFC-Controller reads the first preset data corresponding to the verification request and stored in the verification end NFC-Controller, and the second preset data corresponding to the verification request in response to the verification request, where the first preset data may be Key_ID, the second preset data may be Communication_Key; and a random number group Random_Number of the current session is generated, and first time data Timestamp_or_Counter is updated. The first time data may be the current time, and the length and precise digits of the time are not specifically limited in this specification.

S404: first verification data is determined, where the first verification data is determined based on the first preset data, the second preset data, the random number group and the first time data.

Specifically, the NFC-Controller generates a random number group Random_Number, updates Timestamp_or_Counter, combines Key_ID as input, and uses Communication_Key to calculate a message verification code (MAC).

MAC=MAC_Generation_Algorithm(Communication_Key,Key_ID||Timestamp_or_Counter||Random_Number)

The Timestamp_or_Counter may choose either a Timestamp form or a Counter form. For example, in a scenario of an NFC-Key of a mobile phone, the Timestamp form may be directly selected; and in a scenario of a card NFC-Key, the Counter form may be selected. || means concatenation.

S406: a first data packet is sent to the request end, where the first data packet includes: the first preset data, the random number group, the first time data, and the first verification data.

The verification end NFC-Controller sends the first data packet {Key_ID, Timestamp_or_Counter, Random_Number, MAC} to a request end NFC-Key.

S408: first encrypted data is received, and second encrypted data is generated based on the first encrypted data, where the first encrypted data is generated at the request end based on the first data packet, and the second encrypted data includes: a control instruction and fifth preset data.

Specifically, the verification end NFC-Controller may receive and decrypt the first encrypted data sent by the request end to generate the second encrypted data, where the first encrypted data is generated at the request end based on the first data packet.

According to the above embodiments, in an embodiment of the present specification, the step that in response to a verification request sent by a request end, first preset data corresponding to the verification request and second preset data corresponding to the verification request are searched for, and a random number group and first time data are generated based on the verification request includes:

verifying whether the verification request matches an internal preset verification request; and if the verification request matches the internal preset verification request, searching for the first preset data corresponding to the verification request and the second preset data corresponding to the verification request, and generating the random number group and the first time data based on the verification request.

In some possible embodiments, the step that second encrypted data is generated based on the first encrypted data includes:

generating a key based on the second preset data and the first data packet;

obtaining the control instruction and the fifth preset data by using the key to decrypt the first encrypted data; and generating the second encrypted data by encrypting the control instruction and the fifth preset data.

Specifically, the verification end NFC-Controller may generate the key based on the second preset data and the first data packet, and use the key to decrypt the first encrypted data to generate the fifth preset data and the control instruction sent by the request end, and use In_Vehicle_NFC_Message_Key to perform secondary encryption on the control instruction and the fifth preset data to generate the second encrypted data.

S410: the second encrypted data is sent to an execution end, where the execution end executes the control instruction based on the following method: determining whether the fifth preset data is the same as internal preset data, and if so, executing the control instruction.

Specifically, the second encrypted data is transmitted to an execution end Central-Controller, where the execution end executes the control instruction based on the following method: determining whether the fifth preset data is the same as the internal preset data, and if so, executing the control instruction; if not, the current session is ended.

According to the above embodiments, in an embodiment of the present specification, the method further includes:

deleting temporary data, where the temporary data includes: the random number group, the first time data, the first verification data, the key, the first encrypted data, the control instruction, the fifth preset data, and the second encrypted data.

Specifically, after the current session is ended, the verification end NFC-Controller may delete all the temporary data, where the temporary data may include, but are not limited to: the random number group, the first time data, the first verification data, the key, the first encrypted data, the control instruction, the fifth preset data, and the second encrypted data.

Exemplarily, still another security authentication method provided by the present invention is described in the following; and on the premise that a near-field communication is established between the request end and the verification end NFC-Controller, the verification end NFC-Controller may correspond to a plurality of different request ends, and an embodiment of the specification uses a single request end to set forth the method, the method including:

(1) An NFC Channel is established between an NFC-Key and an NFC-Reader. That is, after the request end and the verification end establish a communication connection.

(2) The NFC-Key sends NFC_Card_ID to a vehicle end NFC-Controller. That is, the request end sends a verification request to the verification end.

(3) The NFC-Controller searches for, based on NFC_Card_ID, the corresponding Key_ID and Communication_Key information. That is, the verification end, in response to the verification request, searches for the first preset data corresponding to the verification request, and the second preset data corresponding to the verification request.

(4) The NFC-Controller generates a random number group Random_Number, updates Timestamp_or_Counter, combines Key_ID as input, and uses Communication_Key to calculate a message verification code (MAC). The NFC-Controller sends {Key_ID, Timestamp_or_Counter, Random_Number, MAC} to the NFC-Key.

MAC=MAC_Generation_Algorithm (Communication_Key, Key_ID∥Timestamp_or_Counter∥Random_Number) Timestamp_or_Counter may choose either a Timestamp form or a Counter form. For example, in a scenario of an NFC-Key of a mobile phone, the Timestamp form may be directly selected; and in a scenario of a card NFC-Key, the Counter form may be selected. ∥ means concatenation. That is, the random number group and the first time data are generated based on the verification request; the first verification data is determined, and the first verification data is determined based on the first preset data, the second preset data, the random number group and the first time data; and the first data packet is sent to the request end, and the first data packet includes: the first preset data, the random number group, the first time data and the first verification data.

(5) The NFC-Key generates a current session key (Session_Key):

The NFC-Key uses the same MAC_Generation_Algorithm as in (4) to recalculate an MAC, and compares whether the MAC is consistent with the received MAC value. If not, the session is ended.

If the MAC values are consistent, it is checked whether a Timestamp_or_Counter value is greater than the Timestamp_or_Counter value of the last session. If the Timestamp_or_Counter value is less than or equal to the Timestamp_or_Counter value of the last session, the current session is ended.

If the Timestamp_or_Counter value is increased compared to the value of the last session, the NFC-Key uses Communication_Key in combination with {Key_ID, TS_or_Counter, Random_Number, MAC} to generate the current session key (Session_Key).

Session_Key=Key_Generation_Algorithm (Communication_Key, Key_ID∥TS_or_Counter∥Random_Number∥MAC) The NFC-Controller uses the same method to generate the current session key (Session_Key). At this time, the NFC-Key and the NFC-Controller each generate the same Session_Key independently. That is, the request end receives the first data packet and obtains the third preset data, the fourth preset data, the second time data, the control instruction and the fifth preset data; the second verification data is determined based on the third preset data, the fourth preset data, the first time data, and the random number group; it is determined whether the first verification data is the same as the second verification data; if the first verification data is the same as the second verification data, it is determined whether a difference between the first time data and the second time data is greater than a preset time threshold; if the difference between the first time data and the second time data is greater than the preset time threshold, a key parameter is generated based on the second preset data and the first data packet.

(6) The NFC-Key uses the Session_Key to encrypt {Command, Sensitive_Infomation}, and transmits a ciphertext message Action_Cipher to the NFC-Controller, where the Command is an instruction to be executed. Action_Cipher=Symmetric_Algorithm_Encrypt (Session_Key, Command∥Sensitive_Infomation). That is, the control instruction and the fifth preset data are encrypted based on the key parameter to generate first encrypted data; and the first encrypted data is sent to the verification end.

(7) The NFC-Controller uses the Session_Key to decrypt the ciphertext message and obtain {Command, Sensitive_Infomation} information.

Command, Sensitive_Infomation=Symmetric_Algorithm_Decrypt (Session_Key, Action_Cipher).

That is, the verification end generates the key parameter based on the second preset data and the first data packet, receives the first encrypted data sent by the request end; and decrypts the encrypted data based on the key parameter to generate the control instruction and the fifth preset data.

(8) The NFC-Controller uses In_Vehicle_NFC_Message_Key to encrypt the {Command, Sensitive_Infomation} information and transmits the ciphertext message to the Central-Controller.

That is, the control instruction and the fifth preset data are encrypted by using a preset key to generate second encrypted data; and the second encrypted data is sent to an execution end.

(9) The Central-Controller uses the In_Vehicle_NFC_Message_Key to decrypt the ciphertext message and obtain the {Command, Sensitive_Infomation} information. The Central-Controller checks whether the Sensitive_Information is the same as a preset value. If yes, a Command vehicle control instruction (such as unlocking the vehicle) is executed; otherwise, the instruction is refused to be executed. That is, the execution end receives the second encrypted data; the preset key is used to decrypt the second encrypted data to obtain the control instruction and the fifth preset data; it is determined whether the fifth preset data is the same as internal preset data; if the fifth preset data is the same as the internal preset data, the control instruction is executed.

(10) The NFC-Controller deletes temporary information such as the Session_Key, the Random_Number, and the MAC, and the current session is ended. That is, the verification end deletes temporary data, where the temporary data includes: the random number group, the first time data, the first verification data, the key parameter, the first encrypted data, the control instruction, the fifth preset data, and the second encrypted data.

The Key_Generation_Algorithm may use common key generation algorithms such as HMAC-SHA256, the MAC_Generation_Algorithm may use common message verification code algorithms such as AES-CMAC, and the Symmetric_Algorithm_Encrypt/Symmetric_Algorithm_Decrypt may use common symmetric key algorithms such as AES-GCM and AES-CBC.

Figure 5:
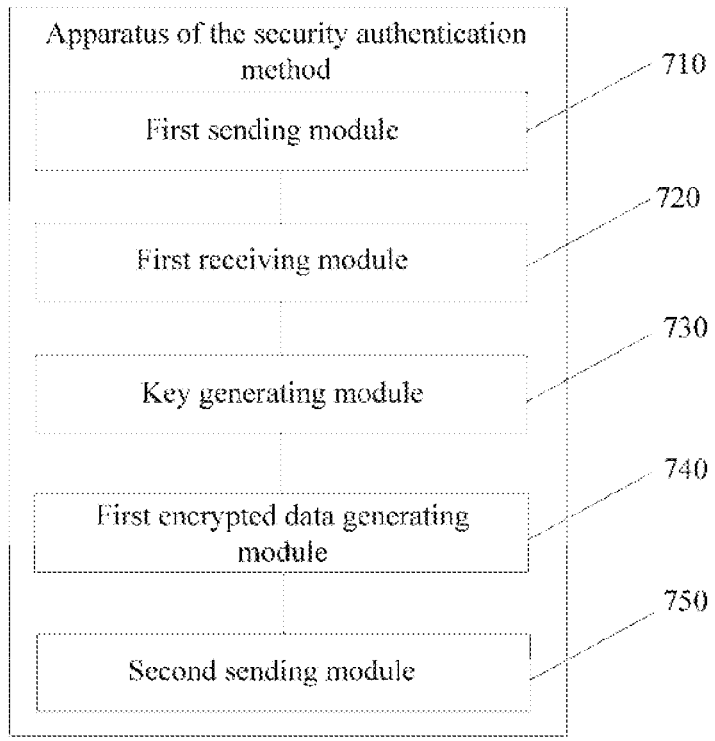
FIG. 5 is a block diagram of a security authentication apparatus of a request end provided by an embodiment of the present invention.

In another aspect, FIG. 5 is a block diagram of a security authentication apparatus of a request end provided by an embodiment of the present invention. As shown in FIG. 5, the present invention provides an apparatus of the security authentication method, the apparatus including:

a first sending module 710, configured to send a verification request to a verification end;

a first receiving module 720, configured to receive a first data packet and obtain third preset data, fourth preset data, second time data, a control instruction, and fifth preset data, where the first data packet is determined by the verification end in response to the verification request;

a key generating module 730, configured to generate a key based on the third preset data, the fourth preset data, the second time data, and the first data packet;

a first encrypted data generating module 740, configured to encrypt the control instruction and the fifth preset data based on the key to generate first encrypted data; and a second sending module 750, configured to send the first encrypted data to the verification end, so that the verification end sends the control instruction and the fifth preset data to an execution end, and the execution end executes the control instruction based on the following method: determining whether the fifth preset data is the same as internal preset data; and if so, executing the control instruction.

According to the above embodiments, in an embodiment of the present specification, the first data packet includes: first preset data, a random number group, first time data, and first verification data, and the key generating module includes:

a second verification data determining unit, configured to determine second verification data based on the third preset data, the fourth preset data, the first time data, and the random number group;

a first determining unit, configured to determine whether the first verification data is the same as the second verification data;

a second determining unit, configured to, if the first verification data is the same as the second verification data, determine whether a difference between the first time data and the second time data is greater than a preset time threshold; and a first key generating unit, configured to, if the difference between the first time data and the second time data is greater than the preset time threshold, generate the key based on the fourth preset data and the first data packet.

Figure 6:
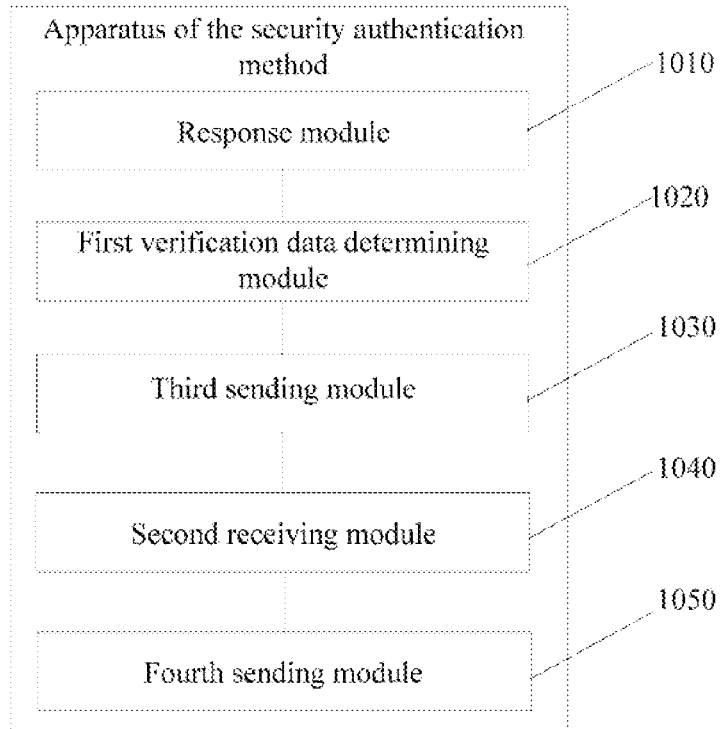
FIG. 6 is a block diagram of a security authentication apparatus of a verification end provided by an embodiment of the present invention.

In another aspect, FIG. 6 is a block diagram of a security authentication apparatus of a verification end provided by an embodiment of the present invention. As shown in FIG. 6, the present invention provides an apparatus of the security authentication method, the apparatus including:

a response module 1010, configured to search for, in response to a verification request sent by a request end, first preset data corresponding to the verification request and second preset data corresponding to the verification request, and generate a random number group and first time data based on the verification request;

a first verification data determining module 1020, configured to determine first verification data, where the first verification data is determined based on the first preset data, the second preset data, the random number group and the first time data;

a third sending module 1030, configured to send a first data packet to the request end, where the first data packet includes: the first preset data, the random number group, the first time data, and the first verification data;

a second receiving module 1040, configured to receive first encrypted data, and generate second encrypted data based on the first encrypted data, where the first encrypted data is generated from the request end based on the first data packet, and the second encrypted data includes: a control instruction and fifth preset data; and a fourth sending module 1050, configured to send the second encrypted data to an execution end, where the execution end executes the control instruction based on the following method: determining whether the fifth preset data is the same as internal preset data; and if so, executing the control instruction.

According to the above embodiments, in an embodiment of the present specification, the response module includes:
- a verification unit, configured to verify whether the verification request matches an internal preset verification request; and
- a random number group generating unit, configured to, if the verification request matches the internal preset verification request, search for the first preset data corresponding to the verification request and the second preset data corresponding to the verification request, and generate the random number group and the first time data based on the verification request.

According to the above embodiments, in an embodiment of the present specification, the second receiving module includes:
- a second key generating unit, configured to generate a key based on the second preset data and the first data packet;
- a decryption unit, configured to obtain the control instruction and the fifth preset data by using the key to decrypt the first encrypted data; and
- a second encrypted data generating unit, configured to generate the second encrypted data by encrypting the control instruction and the fifth preset data.

According to the above embodiments, in an embodiment of the present specification, the apparatus further includes:
- a deleting module, configured to delete temporary data, where the temporary data includes: the random number group, the first time data, the first verification data, the key, the first encrypted data, the control instruction, the fifth preset data, and the second encrypted data.

It should be noted that, when implementing functions of the apparatus provided by the above embodiments, only division of the above functional modules is taken as an example for illustration, in practical applications, the above functions may be allocated to different functional modules to complete as needed, i.e. an internal structure of the apparatus is divided into different functional modules to complete all or part of the functions described above. In addition, the apparatus and method embodiments provided in the embodiments belong to the same concept, and a specific implementation process thereof is detailed in the method embodiments, and details are not described herein again.

Figure 7:
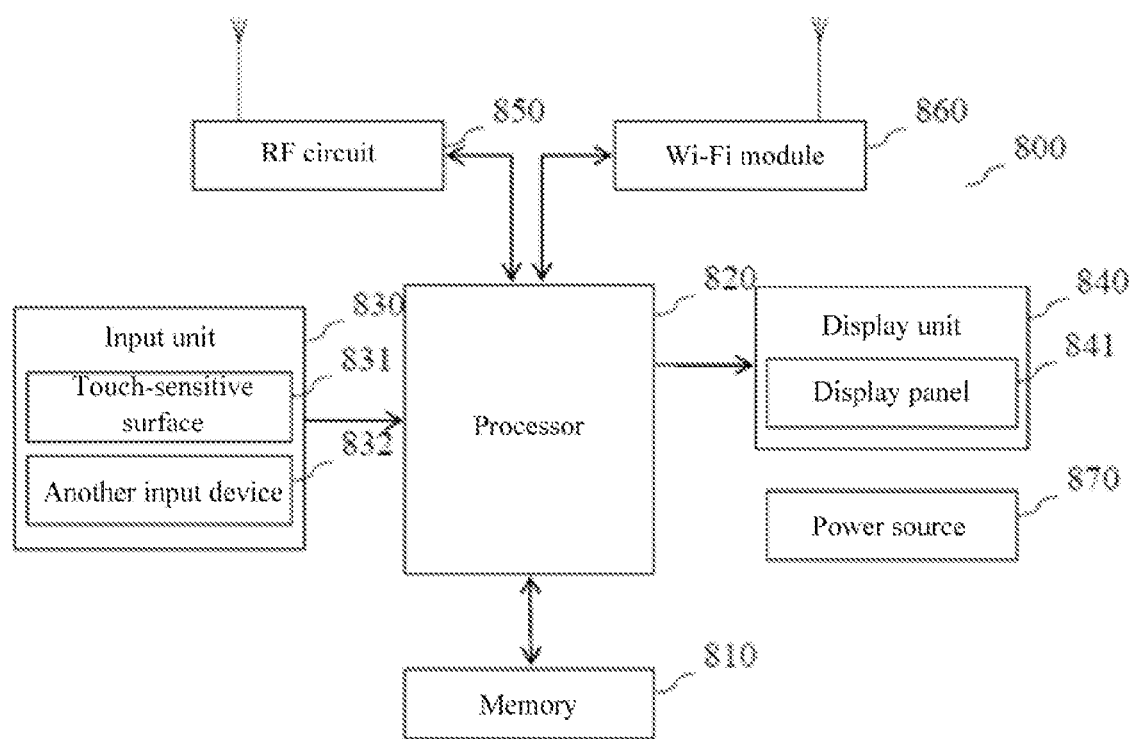
FIG. 7 is a structural schematic diagram of an electronic device provided by an embodiment of the present invention.

In another aspect, FIG. 7 is a structural schematic diagram of an electronic device provided by an embodiment of the present invention. As shown in FIG. 7, the present invention provides an electronic device, the electronic device including a processor and a memory, where the memory stores at least one instruction, at least one program, and a code set or an instruction set, where the at least one instruction, the at least one program, and the code set or the instruction set are loaded and executed by the processor to implement any one of the security authentication methods described above.

In still another aspect, the present invention further provides a vehicle, the vehicle being provided with a close range wireless communication system, where the close range wireless communication system includes the apparatus of the security authentication method described above.

It should be noted that the various embodiments in the specification are described in a progressive manner, each embodiment focuses on the differences from other embodiments, and the same or similar parts between the embodiments can be seen with reference to each other. A testing method provided by an embodiment of the present invention has the same implementation principle and generated technical effect as the foregoing system embodiments. For a brief description, the parts that are not mentioned in the method embodiments may refer to the corresponding contents in the foregoing system embodiments.

In the several embodiments provided in the present application, it should be understood that the disclosed system and method may also be implemented in another manner. The apparatus embodiments described above are merely illustrative. For example, the flowcharts and block diagrams in the accompanying drawings show the possibly implemented architecture, functions, and operations of the apparatus, methods, and computer program products according to a plurality of embodiments of the present invention. In this regard, each block in the flowcharts or block diagrams may represent a module, program segment, or part of a code, and the module, program segment, or part of the code includes one or more executable instructions for implementing the specified logical functions. It should also be noted that in some alternative implementations, the functions annotated in the block may also occur in an order different from the order annotated in the accompanying drawings. For example, two consecutive blocks may actually be executed substantially in parallel, or they may sometimes be executed in a reverse order, which depends on the functions involved. It should also be noted that each block in the block diagrams and/or flow charts, and a combination of the blocks in the block diagrams and/or flow charts, may be implemented by a dedicated hardware-based system that performs the specified functions or actions, or may be implemented by a combination of dedicated hardware and computer instructions.

If implemented in a form of software functional units, and sold or used as independent products, the functions may be stored in a computer-readable storage medium. Based on this understanding, the technical solution of the present invention essentially or a part that contributes to the prior art, or part of the technical solution may be embodied in a form of a software product; and the computer software product is stored in a storage medium and includes a plurality of instructions which are used to enable a computer device (which may be a personal computer, a server, or a network device, etc.) to execute all or part of the steps of the methods described in the various embodiments of the present invention. The storage medium includes: various media that can store program codes such as a USB flash disk, a mobile hard disk, a read-only memory (ROM), a random access memory (RAM), a magnetic disk or an optical disk.

In a specific embodiment, as shown in FIG. 7, a structural schematic diagram of an electronic device provided by an embodiment of the present invention is shown. The electronic device 800 may include a memory 810 of one or more computer-readable storage media, a processor 820 of one or more processing cores, an input unit 830, a display unit 840, a radio frequency (RF) circuit 850, a wireless fidelity (Wi-Fi) module 860 and a power source 870 and other components. Those skilled in the art may understand that a structure of the electronic device shown in FIG. 7 does not limit the electronic device 800, and the electronic device may include more or fewer components than shown, or a combination of certain components, or different component arrangements.

The memory 810 may be configured to store software programs and modules, and the processor 820 executes various functional applications and data processing by running or executing the software programs and modules stored in the memory 810 and calling data stored in the memory 810. The memory 810 may mainly include a program storage area and a data storage area, where the program storage area may store an operating system, at least one application program required by a function, etc.; and the data storage area may store data created based on usage of the electronic device, etc. In addition, the memory 810 may include a high-speed random access memory, and may further include a non-volatile memory, such as a hard disk, an internal memory, a plug-in hard disk, a smart media card (SMC), a secure digital (SD) card, a flash card, at least one magnetic disk memory, a flash memory, or another volatile solid-state memory. Correspondingly, the memory 810 may further include a memory controller to provide the processor 820 with access to the memory 810.

The processor 820 is a control center of the electronic device 800, uses various interfaces and lines to connect various parts of the entire electronic device, and executes various functions of the electronic device 800 and the data processing by running or executing the software programs and/or modules stored in the memory 810 and by calling the data stored in the memory 810, so as to monitor the electronic device 800 as a whole. The processor 820 may be a central processing unit (CPU), or be a general-purpose processor, a digital signal processor (DSP), an application specific integrated circuit (ASIC), a field-programmable gate array (FPGA) or another programmable logic device, a discrete gate or a transistor logic device, a discrete hardware component, etc. The general-purpose processor may be a microprocessor, or the processor may be any conventional processor or the like.

The input unit 830 may be used to receive input digital or character information, and generate a keyboard, a mouse, a joy stick, an optical or trackball signal input related to user settings and function control. Specifically, the input unit 830 may include an image input device 831 and another input device 832. The image input device 831 may be a camera or a photoelectric scanning device. In addition to the image input device 831, the input unit 830 may further include another input device 832. Specifically, another input device 832 may include, but is not limited to, one or more of a physical keyboard, a function key (such as a volume control key, a switch key, etc.), a trackball, a mouse, a joy stick, etc.

The display unit 840 may be configured to display information input by a user or information provided to the user, and various graphical user interfaces of the electronic device. The graphical user interfaces may be composed of graphics, text, icons, videos, and any combination thereof. The display unit 840 may include a display panel 841. Optionally, the display panel 841 may be configured by using a liquid crystal display (LCD), an organic light-emitting diode (OLED), etc.

The RF circuit 850 may be configured to receive and send signals during information receiving and transmitting or during a call. Particularly, when a downlink information of a base station is received, the downlink information is sent to and processed by one or more processors 820; and in addition, data related to uplink is sent to the base station. Generally, the RF circuit 850 includes, but is not limited to an antenna, at least one amplifier, a tuner, one or more oscillators, a subscriber identity module (SIM) card, a transceiver, a coupler, a low noise amplifier (LNA), a duplexer, etc. In addition, the RF circuit 850 may further communicate with the network and other devices by means of wireless communication. The wireless communication may use any communication standard or protocol, including but not limited to a global system of mobile communication (GSM), a general packet radio service (GPRS), a code division multiple access (CDMA), a wideband code division multiple access (WCDMA), a long term evolution (LTE), an email, a short messaging service (SMS), etc.

Wi-Fi belongs to a short-distance wireless transmission technology, and the electronic device 800 may help, by means of the Wi-Fi module 860, the user receive and send the email, browse web pages, access streaming media, etc., and provides the user with wireless broadband Internet access. Although FIG. 7 shows the Wi-Fi module 860, it may be understood that the Wi-Fi module 860 is not a necessary component of the electronic device 800, and may be omitted as needed without changing the essence of the invention.

The electronic device 800 further includes the power source 870 (such as a battery) for supplying power to various components. Preferably, the power source may be logically connected to the processor 820 via a power source management system, so as to implement functions such as charging, discharging, and power consumption management by means of the power source management system. The power source 870 may further include any component such as one or more direct current or alternating current power sources, a recharging system, a power source failure detection circuit, a power source converter or inverter, and a power source status indicator.

It should be noted that although not shown, the electronic device 800 may further include a bluetooth module, etc., and details are not described herein.

The embodiments of the present invention further provide a storage medium, where the storage medium stores at least one instruction, at least one program, and a code set or an instruction set, where the at least one instruction, the at least one program, and the code set or the instruction set are executed by a processor of an electronic device to implement any one of the security authentication methods.

Optionally, in an embodiment of the present invention, the storage medium may include, but is not limited to: various media that can store program codes such as a USB flash disk, a read-only memory (ROM), a random access memory (RAM), a mobile hard disk, a magnetic disk, or an optical disk.

It should be noted that the above sequence of embodiments of the present invention is only for description, and does not represent the advantages or disadvantages of the embodiments. In addition, specific embodiments of this specification have been described above. Other embodiments are within the scope of the appended claims. In some cases, the actions or steps recited in the claims may be performed in an order different from those in the embodiments and still achieve desired results. In addition, the processes depicted in the accompanying drawings do not necessarily require the particular order or sequential order shown to achieve the desired results. In some implementations, multitasking processing and parallel processing are possible or may be advantageous.

Embodiments in the specification are described in a progressive way, same and similar parts among the embodiments can refer to one another, and each embodiment focuses on differences from the other embodiments. In particular, for apparatus, electronic device, and storage medium embodiments, which are substantially similar to the method embodiments, the descriptions are relatively simple, and where relevant, reference can be made to partial descriptions of the method embodiments.

Those of ordinary skill in the art can understand that all or part of the steps for implementing the above embodiments may be completed by hardware or by a program instructing related hardware, and the program may be stored in a computer-readable storage medium, which may be a read-only memory, a magnetic disk, or an optical disc, etc.

Finally, it should be noted that the above embodiments are only specific implementations of the present invention and are used to illustrate the technical solutions of the present invention, but not limit them. The protection scope of the present invention is not limited thereto. Although the present invention has been described in detail with reference to the foregoing embodiments, those of ordinary skills in the art should understand that: within the technical scope disclosed in the present invention, any person skilled in the art may still perform modifications or easily conceivable changes on the technical solutions described in the foregoing embodiments, or perform equivalent substitutions on some of the technical features. However, these modifications, changes or substitutions do not make the essence of the corresponding technical solutions deviate from the spirit and scope of the technical solutions of the embodiments of the present invention, and should be covered within the scope of protection of the present invention. Therefore, the scope of protection of the present invention shall be on the basis of the protection scope of the above claims.

What is claimed is:

1. A security authentication method, comprising:
    sending a verification request to a verification end;
    receiving a first data packet and acquiring third preset data, fourth preset data, second time data, a control instruction, and fifth preset data, wherein the first data packet is determined by the verification end in response to the verification request, and the first data packet comprises: first preset data, a random number group, first time data, and first verification data;
    generating a key based on the third preset data, the fourth preset data, the second time data, and the first data packet, wherein generating the key comprises:
        determining second verification data based on the third preset data, the fourth preset data, the first time data, and the random number group;
        determining whether the first verification data is the same as the second verification data;
        if the first verification data is the same as the second verification data, determining whether a difference between the first time data and the second time data is greater than a preset time threshold; and
        if the difference between the first time data and the second time data is greater than the preset time threshold, generating the key based on the fourth preset data and the first data packet;
    encrypting the control instruction and the fifth preset data based on the key to generate first encrypted data; and
    sending the first encrypted data to the verification end, so that the verification end sends the control instruction and the fifth preset data to an execution end, and the execution end executes the control instruction based on the following method: determining whether the fifth preset data is the same as internal preset data; and if so, executing the control instruction.

2. The method according to claim 1, wherein before sending the verification request to the verification end, the method further comprises: establishing a near-field communication connection with the verification end.

3. A security authentication method, comprising:
    searching for, in response to a verification request sent by a request end, first preset data corresponding to the verification request and second preset data corresponding to the verification request, and generating a random number group and first time data based on the verification request, wherein searching for the first preset data comprises:
        verifying whether the verification request matches an internal preset verification request; and
        if the verification request matches the internal preset verification request, searching for the first preset data corresponding to the verification request and the second preset data corresponding to the verification request, and generating the random number group and the first time data based on the verification request;
    determining first verification data, wherein the first verification data is determined based on the first preset data, the second preset data, the random number group and the first time data;
    sending a first data packet to the request end, wherein the first data packet comprises: the first preset data, the random number group, the first time data, and the first verification data;
    receiving first encrypted data, and generating second encrypted data based on the first encrypted data, wherein the first encrypted data is generated from the request end based on the first data packet, and the second encrypted data comprises: a control instruction and fifth preset data; and
    sending the second encrypted data to an execution end, wherein the execution end executes the control instruction based on the following method: determining whether the fifth preset data is the same as internal preset data; and if so, executing the control instruction.

4. The method according to claim 3, wherein the generating second encrypted data based on the first encrypted data comprises:
    generating a key based on the second preset data and the first data packet;
    obtaining the control instruction and the fifth preset data by using the key to decrypt the first encrypted data; and
    generating the second encrypted data by encrypting the control instruction and the fifth preset data.

5. The method according to claim 4, further comprising:
    deleting temporary data, wherein the temporary data comprises: the random number group, the first time data, the first verification data, the key, the first encrypted data, the control instruction, the fifth preset data, and the second encrypted data.

6. An apparatus of a security authentication method, the apparatus comprising:
    a processor, configured to search for, in response to a verification request sent by a request end, first preset data corresponding to the verification request and second preset data corresponding to the verification request, generate a random number group and first time data based on the verification request, and
    determine first verification data, wherein the first verification data is determined based on the first preset data, the second preset data, the random number group and the first time data; and
    a radio frequency circuit or WiFi module, configured to:
        send a first data packet to the request end, wherein the first data packet comprises: the first preset data, the random number group, the first time data, and the first verification data; and
    receive first encrypted data;
    the processor further configured to generate second encrypted data based on the first encrypted data, wherein the first encrypted data is generated from the request end based on the first data packet, and the second encrypted data comprises: a control instruction and fifth preset data;

the radio frequency circuit or WiFi module further configured to send the second encrypted data to an execution end, wherein the execution end executes the control instruction based on the following method: determining whether the fifth preset data is the same as internal preset data; and if so, executing the control instruction; and the processor is further configured to:
  verify whether the verification request matches an internal preset verification request; and
  if the verification request matches the internal preset verification request, search for the first preset data corresponding to the verification request and the second preset data corresponding to the verification request, and generate the random number group and the first time data based on the verification request.

7. The apparatus of the security authentication method according to claim 6, wherein the processor is configured to:
  generate a key based on the second preset data and the first data packet;
  obtain the control instruction and the fifth preset data by using the key to decrypt the first encrypted data; and
  generate the second encrypted data by encrypting the control instruction and the fifth preset data.

8. The apparatus of the security authentication method according to claim 7,
  wherein the processor is further configured to delete temporary data, wherein the temporary data comprises: the random number group, the first time data, the first verification data, the key, the first encrypted data, the control instruction, the fifth preset data, and the second encrypted data.

* * * * *